Patented Mar. 7, 1950

2,500,128

UNITED STATES PATENT OFFICE 2,500,128

PROCESS FOR PREPARING CYANINE DYE INTERMEDIATES

Edward B. Knott, Harrow, Wealdstone, England, assignor to Eastman Kodak Company, Rochester, N. Y., a corporation of New Jersey No Drawing. Application January 3, 1946, Serial No. 638,913. In Great Britain May 10, 1945

9 Claims. (Cl. 260—240.8)

This invention relates to a process for preparing intermediates for dyes, especially photographic sensitizing dyes.

In my copending application Serial No. 638,912 filed January 3, 1946, I have described the production of N-substituted-β-aminovinyl derivatives of heterocyclic nitrogen compounds by heating together an alkyl orthoformate, a primary or secondary amine or a N-arylformamide and a quaternary salt of a heterocyclic nitrogen compound having a reactive alkyl, e. g. methyl, group attached to the carbon atom in the 2- or 4-position to the quaternary nitrogen atom, or having such a reactive alkyl group attached to both of said carbon atoms.

I have now found that β-arylaminovinyl derivatives of heterocyclic nitrogen compounds can be formed in high yield by heating together an alkyl orthoester, a diarylformamidine and a quaternary salt of a heterocyclic nitrogen base having a reactive alkyl, e. g. methyl, group attached to the carbon atom in the 2- or 4-position to the quaternary nitrogen atom.

It is, of course, known that such quaternary salts will condense with diarylformamidines to give β-arylaminovinyl derivatives (see British Patent 344,409, accepted March 4, 1931).

I find, however, that substantially higher yields are obtained when the reaction is carried out in the presence of an alkyl orthocarboxylic ester, i. e. an alkyl orthocarboxylate. When the orthoester is not present, an arylamine is liberated according to the equation:

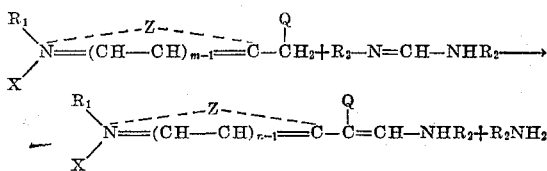

where X represents an acid radical, i. e. an anion, e. g. halide, p-toluenesulfonate, alkylsulfate, perchlorate, etc., $R_1$ represents an alkyl group, e. g. methyl, ethyl, isobutyl, n-amyl, cetyl, etc., an aralkyl group, e. g. benzyl, an aryl group, e. g. phenyl, etc., $n$ represents a positive integer of from 1 to 2, Q represents a hydrogen atom, an alkyl group, an aryl group or a cyano group, Z represents the non-metallic atoms necessary to complete a heterocyclic nucleus, e. g. a heterocyclic nucleus containing from 5 to 6 atoms in the heterocyclic ring, for instance, a heterocyclic nucleus of the oxazole series, the thiazole series, the selenazole series, the pyridine series, the quinoline series, the indolenine series, etc., and $R_2$ represents an aryl group, e. g. a phenyl group, a chlorophenyl group, a methoxyphenyl group, a naphthyl group, a diphenyl group, etc.

It is believed that the arylamine ($R_2NH_2$) which is liberated inhibits the condensation and that the orthoester, present during the reaction according to the process of my invention, condenses with the liberated arylamine, forming further diarylamidine which, if the orthoester employed is an orthoformate, can condense with quaternary salt. If the ortho ester employed is other than an orthoformate, a diarylamidine other than a diarylformamidine is produced (a diarylacetamidine in the case of an orthoacetate). Diarylamidines other than diarylformamidine do not condense appreciably with the quaternary salt, but the yield in my new process is nevertheless improved even when orthoesters other than orthoformates are employed, since the inhibiting effect of the arylamine is reduced.

In my new process, any alkyl orthocarboxylate can be employed, e. g. methylorthoformate, ethylorthoformate, butylorthoformate, ethylorthoacetate, ethylorthophenylacetate, ethylorthobenzoate, etc. Advantageously about two molecular proportions of the quaternary salt, about one molecular proportion of an alkyl orthocarboxylate and about one molecular proportion of a diarylformamidine are employed in practicing my invention. However, good results can be obtained with other proportions, e. g. equimolecular proportions of all three reactants.

Generally my new process proceeds satisfactorily at the temperature of a steam bath. Higher temperatures can be used, and in some cases, higher temperatures give a better yield. Thus, the quaternary salts of picolines give the best yields in boiling n-amyl alcohol.

Of the quaternary salts, the p-toluenesulfonates are preferred because of their greater solubility.

The following examples will serve to illustrate further the manner of practicing my new process.

*Example I.*—2-β-anilinovinylpyridine methiodide

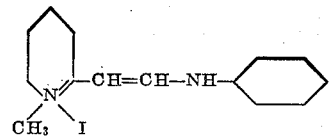

α-Picoline (1.86 g.) and methyl p-toluenesulfonate (3.7 g.) were fused at 100° C. for 15 minutes. To the solid quaternary salt was added diphenylformamidine (4 g.), ethyl orthoformate (3 g.) and n-amyl alcohol and the whole refluxed for 2 hours. A saturated aqueous solution of potassium iodide (10 cc.) was added, the mixture cooled and the solid collected. Recrystallized from hot water, it formed yellow needles, M. P. 210° to 212° C. in 61 per cent yield.

*Example II.—2-β-anilinovinylquinaldine etho-p-toluenesulfonate*

Quinaldine etho-p-toluenesulfonate (3.43 g.), diphenylformamidine (1 g.), ethyl orthoformate (0.75 g.) and ethyl alcohol were heated on the steam bath for one hour allowing the alcohol to evaporate. The whole solidified after 20 minutes. The cake was well washed with acetone and purified by boiling up with a little ethyl alcohol. It formed a yellow-brown crystalline powder, M. P. 240° C. Yield 70 per cent.

*Example III.—2-β-anilinovinylbenzoxazole etho-p-toluenesulfonate*

2-methylbenzoxazole etho-p-toluenesulfonate (3.33 g.) diphenylformamidine (1.96 g.), ethyl orthoformate (1.5 g.) and ethyl alcohol (5 cc.) were heated on the steam bath for one hour. After 35 minutes the whole had solidified. The yellow cake was washed well with acetone and recrystallized from a little methyl alcohol. It formed yellow tablets, M. P. 218° C. Yield 80 per cent.

*Example IV.—2-β-anilinovinylpyridine methiodide*

α-Picoline metho-p-toluenesulfonate (5.56 g.), diphenylformamidine (4 g.) and ethyl orthoacetate (3.24 g.) were refluxed for 2 hours with n-amyl alcohol (10 cc.). The iodide obtained as in Example I was obtained in 58 per cent yield.

*Example V.—2-β-anilinovinylquinoline etho-p-toluenesulfonate*

Quinaldine etho-p-toluenesulfonate (3.43 g.), diphenylformamidine (2 g.), ethyl orthoacetate (1.62 g.) and ethyl alcohol (2 cc.) were heated on the water bath for one hour. The whole solidified after 30 minutes. The required substance isolated as in Example II represented a 70 per cent yield.

The following table shows the comparative yields of β-arylaminovinyl compound obtained with and without an orthoester.

In a manner similar to that illustrated above, still other β-arylaminovinyl compounds can be prepared.

The orthoesters most advantageously employed in practicing my invention can be represented by the following general formula:

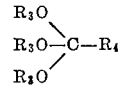

wherein $R_3$ represents an alkyl group containing from 1 to 4 carbon atoms and $R_4$ represents a hydrogen atom or an alkyl group containing from 1 to 4 carbon atoms.

What I claim as my invention and desire to be secured by Letters Patent of the United States is:

1. A process for preparing a β-arylaminovinyl compound comprising condensing a quaternary salt selected from those represented by the following general formula:

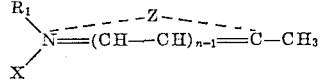

wherein $R_1$ represents an alkyl group, X represents an anion, n represents a positive integer of from 1 to 2, and Z represents the non-metallic atoms necessary to complete a heterocyclic nucleus containing from 5 to 6 atoms in the heterocyclic ring, with a diarylformamidine selected from those represented by the following general formula:

$$R_2-N=CH-NHR_2$$

wherein $R_2$ represents an aryl group, in the presence of an alkyl orthocarboxylate.

2. A process for preparing a β-arylaminovinyl compound comprising condensing a quaternary salt selected from those represented by the following general formula:

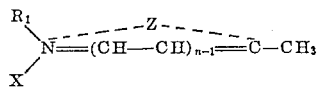

wherein $R_1$ represents an alkyl group, X represents an anion, n represents a positive integer of from 1 to 2, and Z represents the non-metallic atoms necessary to complete a heterocyclic nucleus containing from 5 to 6 atoms in the hetero-

*Table*

| quaternary salt (moles) | diphenylformamidine (moles) | orthoester (moles) | temperature (°C.) | % Yield of β-arylaminovinyl compound* |
|---|---|---|---|---|
| α-picolinemetho-p-toluenesulfonate, 1 | 2 | none | 160 | 46 |
| Do. | 1 | none | 138 | 23 |
| Do. | 2 | none | 138 | 35 |
| Do. | 1 | ethyl orthoformate, 1 | 138 | 61 |
| Do. | 0.5 | ethyl orthoformate, 0.5 | 138 | 57 |
| Do. | 1 | ethyl orthoacetate, 1 | 138 | 58 |
| quinaldine etho-p-toluenesulfonate, 1 | 1 | none | 100 | 43 |
| Do. | 0.5 | ethyl orthoformate, 0.5 | 100 | 70 |
| Do. | 1 | ethyl orthoacetate, 1 | 100 | 70 |
| 2-methyl-benzoxazole etho-p-toluenesulfonate, 1 | 1 | none | 100 | 46 |
| Do. | 1 | ethyl orthoformate, 1 | 100 | 80 |

*Yield based on the quantity of quaternary salt employed.

cyclic ring, with a diarylformamidine selected from those represented by the following general formula:

$$R_2-N=CH-NHR_2$$

wherein $R_2$ represents an aryl group of the benzene series, in the presence of an alkyl orthoformate.

3. A process for preparing a β-arylaminovinyl compound comprising condensing from about one to about two molecular proportions of a quaternary salt selected from those represented by the following general formula:

wherein $R_1$ represents an alkyl group, X represents an anion, n represents a positive integer of from 1 to 2, and Z represents the non-metallic atoms necessary to complete a heterocyclic nucleus containing from 5 to 6 atoms in the heterocyclic ring, with about one molecular proportion of a diarylformamidine selected from those represented by the following general formula:

$$R_2-N=CH-NHR_2$$

wherein $R_2$ represents an aryl group, in the presence of an alkyl orthocarboxylate.

4. A process for preparing a β-arylaminovinyl compound comprising condensing from about one to about two molecular proportions of a quaternary salt selected from those represented by the following general formula:

wherein $R_1$ represents an alkyl group, X represents an acid radical, n represents a positive integer of from 1 to 2, and Z represents the non-metallic atoms necessary to complete a heterocyclic nucleus containing from 5 to 6 atoms in the ring, with about one molecular proportion of a diarylformamidine selected from those which are represented by the following general formula:

$$R_2-N=CH-NHR_2$$

wherein $R_2$ represents an aryl group of the benzene series, in the presence of about one molecular proportion of an alkyl orthoformate.

5. A process for preparing a β-anilinovinyl compound comprising condensing from about one to about two molecular proportions of a quaternary salt selected from those represented by the following general formula:

wherein $R_1$ represents a primary alkyl group containing from 1 to 5 carbon atoms, with about one molecular proportion of diphenylformamidine, in the presence of an alkyl orthocarboxylate having a molecular weight from that of methyl orthoformate to that of ethyl orthophenylacetate.

6. A process for preparing 2-β-anilinovinylpyridine metho-p-toluenesulfonate comprising condensing from about one to about two molecular proportions of α-picoline metho-p-toluenesulfonate with about one molecular proportion of diphenylformamidine, in the presence of ethyl orthoformate.

7. A process for preparing 2-β-anilinovinylpyridine metho-p-toluenesulfonate comprising condensing from about one to about two molecular proportions of α-picoline metho-p-toluenesulfonate with about one molecular proportion of diphenylformamidine, in the presence of ethyl orthoacetate.

8. A process for preparing a β-anilinovinyl compound comprising condensing from about one to about two molecular proportions of a quaternary salt selected from those represented by the following general formula:

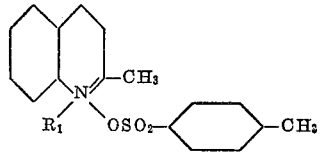

wherein $R_1$ represents a primary alkyl group containing from 1 to 5 carbon atoms with about one molecular proportion of diphenylformamidine, in the presence of an alkylorthocarboxylate having a molecular weight from that of methyl orthoformate to that of ethyl orthophenylacetate.

9. A process for preparing 2-β-anilinovinylquinaldine etho-p-toluenesulfonate comprising condensing from about one to about two molecular proportions of quinaldine etho-p-toluenesulfonate with about one molecular proportion of diphenylformamidine, in the presence of ethyl orthoformate.

EDWARD B. KNOTT.

REFERENCES CITED

The following references are of record in the file of this patent:

UNITED STATES PATENTS

| Number | Name | Date |
|---|---|---|
| 2,066,966 | Dieterle | Feb. 4, 1932 |

FOREIGN PATENTS

| Number | Country | Date |
|---|---|---|
| 344,409 | Great Britain | 1930 |

OTHER REFERENCES

College Organic Chemistry by Reid D. Van Nostrand 1929, pp. 232–235.

Beilstein, vol. 12, 4th edition, page 236.